Mar. 27, 1923.

W. WENDERHOLD

VELOCIPEDE

Filed Oct. 6, 1917

INVENTOR

William Wenderhold

Patented Mar. 27, 1923.

1,449,643

UNITED STATES PATENT OFFICE.

WILLIAM WENDERHOLD, OF NEW YORK, N. Y., ASSIGNOR, BY MESNE ASSIGNMENTS, TO EDWIN J. BANZHAF, OF NEW YORK, N. Y.

VELOCIPEDE.

Application filed October 6, 1917. Serial No. 195,194.

*To all whom it may concern:*

Be it known that I, WILLIAM WENDERHOLD, a citizen of the United States, residing at New York city, in the county and State of New York, have invented certain new and useful Improvements in Velocipedes, of which the following is a clear, full, and exact description.

My invention consists of a toy propelled by the weight of the rider thereof, the propulsion being accomplished by having the rider go through or making the same motion as a horseback rider.

Referring to the drawings.

Figure 1:
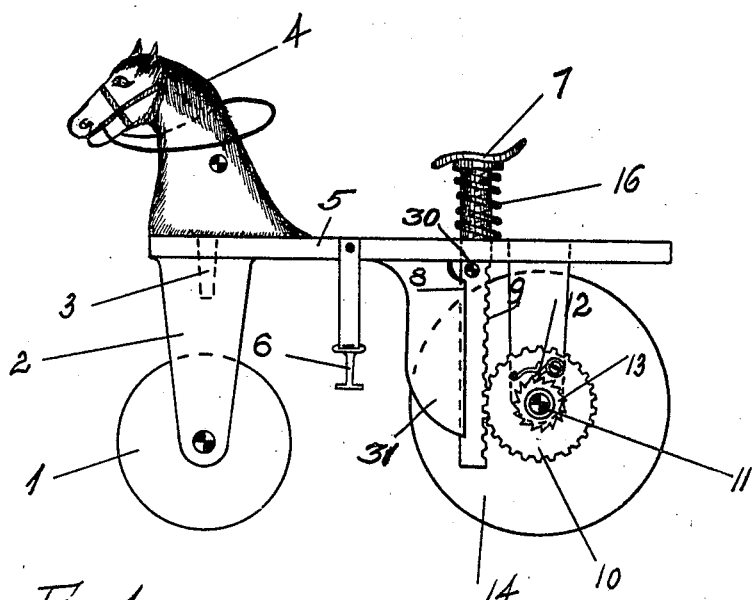
Fig. 1 is a side elevation of the device.
Figure 2:
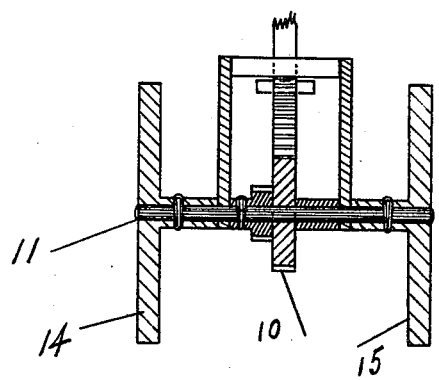
Fig. 2 is a section through the propelling mechanism.

The front wheel 1 is mounted in a fork 2, which fork is fastened onto the steering axis 3, which is a portion of the pivotally mounted steering head 4. The general support 5 has stirrups or foot rests 6. Saddle 7 is mounted upon a push bar 8, which is provided with teeth 9 which mesh with the teeth of the wheel 10 which is loosely mounted on the rear axle 11. The wheel 10 has a pawl 12 which engages a ratchet wheel. This ratchet wheel 13 is fastened on axle 11 on which axle are also fastened the two rear wheels or drivers 14 and 15. The bar 9 is pushed upward by the spring 16.

The bar 8 is provided with a pin 30 positioned below the frame 5 to form a limit stop for the upward movement of the bar 8 by means of the spring 16 when the weight of the operator of the velocipede is shifted from the saddle 7 to the stirrups 6 simulating the movement of horse back riding. The frame 5 also has rigidly secured thereto on the under surface thereof a guide member 31 which is grooved to form a guide for the reciprocal vertical movement of the bar 8 and to maintain the same constantly in mesh with the gear wheel 10. The operation of the device will be apparent. The operator, presumably a child, will rest its feet in the stirrups 6 and will then seat itself upon the saddle 7 which, as above explained is carried at the top of the bar 8. The weight of the child causes the bar 8 to descend against the action of the spring 16, the bar 8 meshing with the gear 10 which is loosely mounted on the axle 11 rotates the gear 10, its top moving forward. The pawl 12 mounted on the gear 10 being held in engagement with the ratchet 13 by means of the spring, as formerly shown, rotates the ratchet 13 and consequently the axle 11. When the bar 8 has been depressed to its limit or as far as the weight of the child will depress the same against the action of the spring 16, the child then again rests its whole or the greater part of its weight in the stirrups by standing therein and thereby allowing the bar 8 to be forced upward by means of the spring 16 until the pin 30 comes in contact with the frame 5. The upward movement of the bar 8 rotates the gear 10 in an opposite direction, the pawl slipping easily over the curved edges of the ratchet teeth as will be readily understood.

Figure 3:
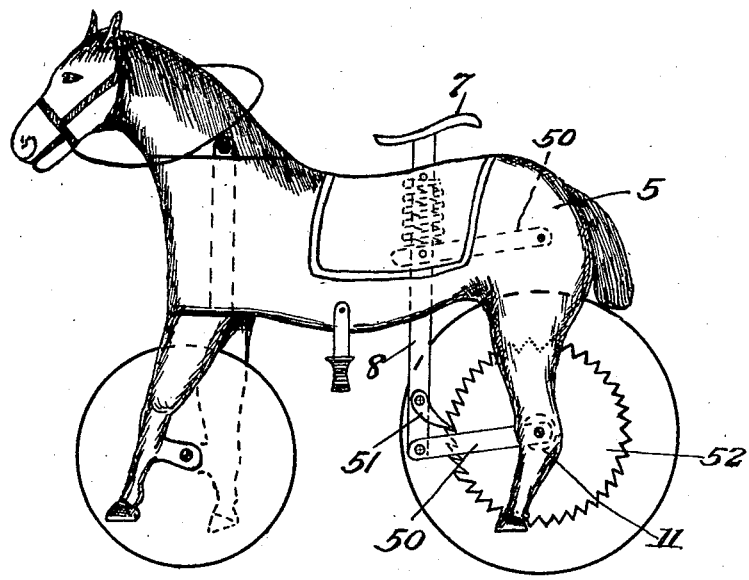
Fig. 3 is a side elevation of a modified construction embodying my invention.

In Fig. 3 I show a slightly modified construction wherein the bar 8 is supported by levers 50 pivotally secured at their ends to the body frame 5. In this instance a pawl 51 engages the teeth of an enlarged ratchet wheel 52 which is secured to the axle 11. In this construction a somewhat circular motion is imparted to the saddle 7 due to the fact that the bar 8 moves vertically and coincidentally about the pivot points of the levers 50.

Many other modifications and changes in detail will readily occur to those skilled in the art without departing from the scope of my invention as defined in the claims.

What I claim as my invention is:

1. In a toy, the combination with a frame mounted on wheels, of a bar slidably mounted in said frame and projecting through the top thereof, a seat carried by the top of said bar, a spring interposed between said seat and said frame and surrounding the slidable bar, stirrups carried by said frame to form a leverage to enable one to raise himself from the seat, and connections between said bar and said wheels whereby when said seat is depressed said wheels will be caused to rotate in a forwardly direction.

2. In a hobby-horse, a frame mounted on wheels, an operating bar slidably mounted in said frame, stirrups depending from said frame, a saddle and a spring mounted on the upper end of said operating bar, said spring being interposed between said saddle and said body frame, teeth on said bar below said spring, and a ratchet mechanism operating with said teeth whereby, when said bar is depressed, said ratchet mechanism will co-operate to cause the hobby-horse to move forward.

Signed at the city, county and State of New York, this 4th day of October, one thousand nine hundred and seventeen.

WILLIAM WENDERHOLD. [L. S.]